Figure 1:
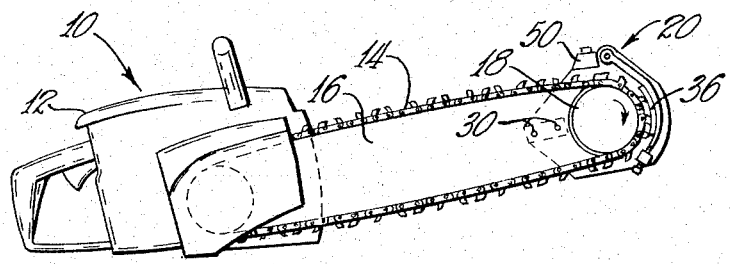

Jan. 2, 1968   A. M. FULLERTON   3,361,012
SAW CHAIN SHARPENER
Filed Feb. 9, 1966

INVENTOR.
ARTHUR M. FULLERTON
BY
ATTORNEYS

United States Patent Office 3,361,012
Patented Jan. 2, 1968

3,361,012
SAW CHAIN SHARPENER
Arthur M. Fullerton, Toledo, Ohio, assignor to American-Lincoln Corporation, Toledo, Ohio, a corporation of Ohio
Filed Feb. 9, 1966, Ser. No. 526,209
8 Claims. (Cl. 76—25)

This invention relates to a saw chain sharpener and more particularly to a saw chain sharpener adapted to be mounted on the nose of a saw bar and equipped with a lubricator for supplying lubricant to the chain during sharpening.

Saw chain sharpeners have been proposed for being mounted permanently on a chain saw housing adjacent the rear or drive sprocket of the saw. While a saw chain can be conveniently sharpened with this arrangement, the sharpening apparatus is continually carried with the chain saw and adds to the weight thereof. This is particularly detrimental in view of the trend toward and emphasis on smaller, lightweight chain saws which can be easily carried about and manipulated. With the sharpening device mounted immediately to the rear of the drive sprocket, sawdust is quickly collected between the sprocket and the sharpening device, which usually necessitates cleaning prior to the use of the sharpening device. There is also a tendency for the drive sprocket to wear and result in erratic sharpening of the saw chain teeth as they move around the sprocket.

The present invention relates to a saw chain sharpener adapted to be mounted on the nose of a saw bar and which can be easily attached to and detached from the bar. With this arrangement, the sharpener is employed only when the chain is to be sharpened and is otherwise completely detached from the entire chain saw. Consequently, the sharpener does not result in a weight problem for the saw nor can it collect sawdust. Further, there is no problem of sprocket wear to cause erratic sharpening or grinding of the teeth. The sharpener can be employed with any chain saw since no changes in the chain saw housing are required. Additionally, in the event the chain should break during sawing, the sharpening apparatus cannot be damaged.

The saw chain sharpener according to the invention also is equipped with a unique lubricator for supplying lubricant to the chain during sharpening. The lubricator is located immediately prior to the sharpening tool and can supply lubricant to the chain under gravity, enabling lubrication with a relatively simple, low-cost device. In a preferred form, the lubricator has a simplified adjustable flow control which is integral with the filler cap thereof. The use of the lubricant increases the sharpening efficiency of the sharpening device and reduces the chance for possible damage to the chain by burning the teeth during sharpening.

It is, therefore, a principal object of the invention to provide an improved saw chain sharpener adapted to be mounted on the nose of a saw bar of a chain saw.

Another object of the invention is to provide a nose-mounted saw chain sharpener equipped with a lubricator.

Still another object of the invention is to provide a saw chain sharpener equipped with a simple, gravity-operated lubricator.

Yet a further object of the invention is to provide a saw chain sharpener with a lubricator equipped with a flow control device integral with the filler cap of the lubricant reservoir.

Figure 4:
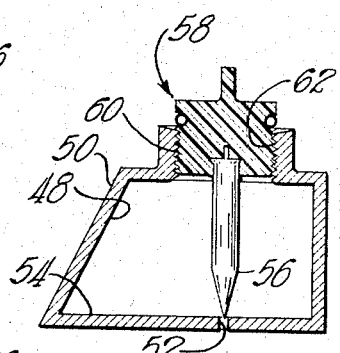
Figure 2:
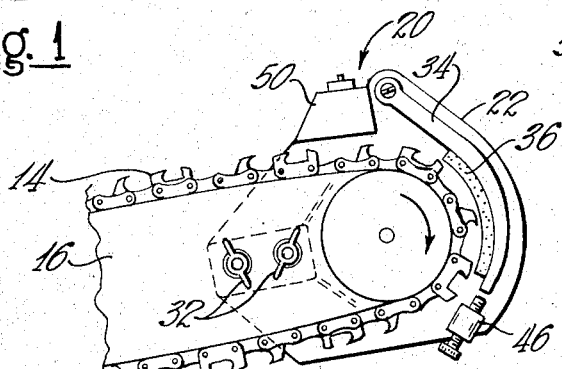
Figure 3:
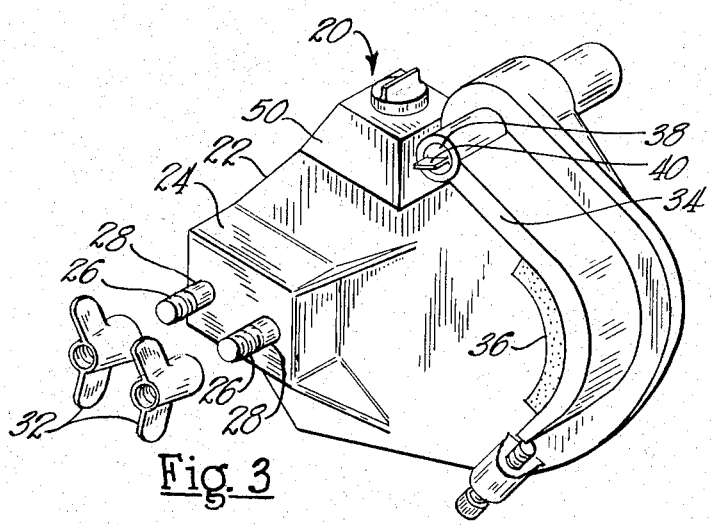
Figure 5:
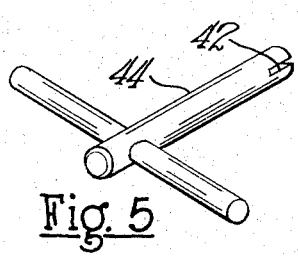

Numerous other objects and advantages of the invention will be apparent from the following detailed description of a preferred embodiment thereof, reference being made to the accompanying drawing, in which:

FIG. 1 is a side view in elevation of a chain saw embodying the invention;
FIG. 2 is an enlarged, fragmentary side view of a saw bar and a saw chain sharpening device embodying the invention;
FIG. 3 is a further enlarged view in perspective of the saw chain sharpening device;
FIG. 4 is a view in vertical cross section taken through a lubricator of the sharpening device; and
FIG. 5 is a view in perspective of a tool used to apply pressure to a sharpening element of the sharpening device.

Referring to the drawing, and particularly to FIG. 1, a chain saw 10 is of any suitable design and includes a housing 12 containing a motor and drive sprocket for driving a saw chain 14 around a saw bar 16. The saw bar 16, in this instance, preferably is of the type having a rotatable roller or pulley 18 at the nose thereof, around which the chain travels.

A sharpening device 20 embodying the invention is mounted on the nose portion of the saw bar 16 when the chain 14 is to be sharpened. The sharpening device includes a main body or frame 22 having a mounting block 24 from which extend two threaded studs 26 having cylindrical bearing portions 28. The portions 28 are received in reamed holes 30 in the saw bar 16 to accurately locate the device 20 therein. The studs 26 are then affixed in the holes 30 (FIG. 1) by wing nuts 32 (FIGS. 2 and 3) by means of which the sharpening device can be quickly assembled with and detached from the saw bar 16.

An arcuate mounting arm 34, which removably carries a sharpening element 36, is pivotally carried by the frame 22 by means of a shaft 38. The element 36 has a radius substantially equal to the radius of the chain at the nose end of the bar. The end of the shaft has a divider 40 which can be received in a slot 42 of a key 44 (FIG. 5) to enable the arm 34 to be pivoted toward and away from the chain when the device 20 is mounted on the saw bar 16. An adjustable stop 46 mounted on the frame 22 is designed to contact an end portion of the arm 34 and limit movement of the sharpening element 36 toward the chain.

In accordance with the invention, an oil reservoir 48 (FIG. 4) is formed by a housing 50 integral with the frame 22. With the housing 50 mounted above the saw chain 14 and just prior to the sharpening element 36, the lubricant can be supplied to the chain by gravity to provide a simple and low-cost construction for the sharpening element 20. An orifice 52 is formed in a bottom wall 54 of the housing and is located directly above the path of the chain 14 so that oil from the reservoir can be metered directly to the chain during sharpening. A needle valve 56 is aligned with the orifice 52 and can be moved toward and away from the orifice to control flow of lubricant therethrough. In a preferred form, the needle valve 56 is functionally integral with a filler cap 58 having a threaded portion 60 threadedly engaged in a filler opening 62, at the top of the housing 50. The cap 58 thereby provides a simple and effective means for controlling and metering lubricant flow through the orifice. The reservoir 48 can be filled when the sharpening device is not in use on the bar with the orifice stopped off by the finger of the operator, for example, until the reservoir is filled. When the cap 58 is replaced, the needle valve 56 then stops off the orifice. When the sharpening device is to be used, the cap 58 can be unscrewed a desired amount to enable flow of lubricant to the chain teeth prior to being subjected to the sharpening element 36.

Various modifications of the above-described embodiment of the invention will be apparent to those skilled in the art, and it is to be understood that such modifications

I claim:

1. A chain saw sharpener for sharpening a saw chain, said sharpener comprising a main body, means for mounting said body in a predetermined position relative to said saw chain, a sharpening element for sharpening the chain and movably mounted on said body, said body having a housing defining a lubricant reservoir above the chain, an orifice in the bottom of said reservoir and positioned directly above the path of the chain, a filler opening in said housing for said reservoir, a filler cap threadedly engaged in said opening, and a needle valve extending toward said bottom orifice for controlling flow of lubricant to the chain from said reservoir.

2. A chain saw sharpener according to claim 1 wherein said mounting means comprises means for mounting said sharpener on the nose end of a chain saw bar, and said sharpening element is adapted to sharpen the chain as it moves around the nose end of said chain saw bar.

3. A chain saw sharpener according to claim 1 characterized by said needle valve being attached to and movable with said filler cap.

4. A chain saw sharpener to be mounted on the nose end of a chain saw bar for sharpening a saw chain, said sharpener comprising a main body, means for mounting said body on said saw bar, a sharpening element for sharpening said chain and movably mounted on said body, said body having a housing defining an oil reservoir above said bar, a supply opening in said reservoir to deposit lubricant on the chain as it moves along the bar toward said sharpening element, a filler opening in said housing for said reservoir, a filler cap for said filler opening, and a valve means supported by said body for controlling flow of oil to the chain from said reservoir.

5. A chain saw sharpener according to claim 4 characterized by said sharpening element having a radius substantially equal to the radius of the chain at the nose end of the chain saw bar.

6. A sharpener according to claim 4 characterized by said supply opening being in the bottom of said reservoir and said valve means constituting a needle valve.

7. A sharpener according to claim 6 characterized by means connecting said needle valve and said filler cap for moving said needle valve relative to said supply opening when said filler cap is moved.

8. A chain saw sharpener according to claim 4 wherein said means for mounting said body on said saw bar comprises a pair of studs having threaded portions adapted to be received through openings in said saw bar, and nuts for threadedly engaging said studs.

References Cited
UNITED STATES PATENTS

| | | | |
|---|---|---|---|
| 418,309 | 12/1889 | Coe | 51—267 XR |
| 2,651,336 | 9/1953 | Warren. | |
| 2,741,275 | 4/1956 | Johnsen et al. | 143—32 |
| 2,821,097 | 1/1958 | Carlton | 76—37 |
| 3,147,644 | 9/1964 | Oehrli | 76—37 |

GRANVILLE Y. CUSTER, JR., *Primary Examiner.*